Jan. 8, 1929.  H. V. McKAY  1,697,925
STRAW CUTTING ATTACHMENT FOR HARVESTERS
Filed Jan. 16, 1925
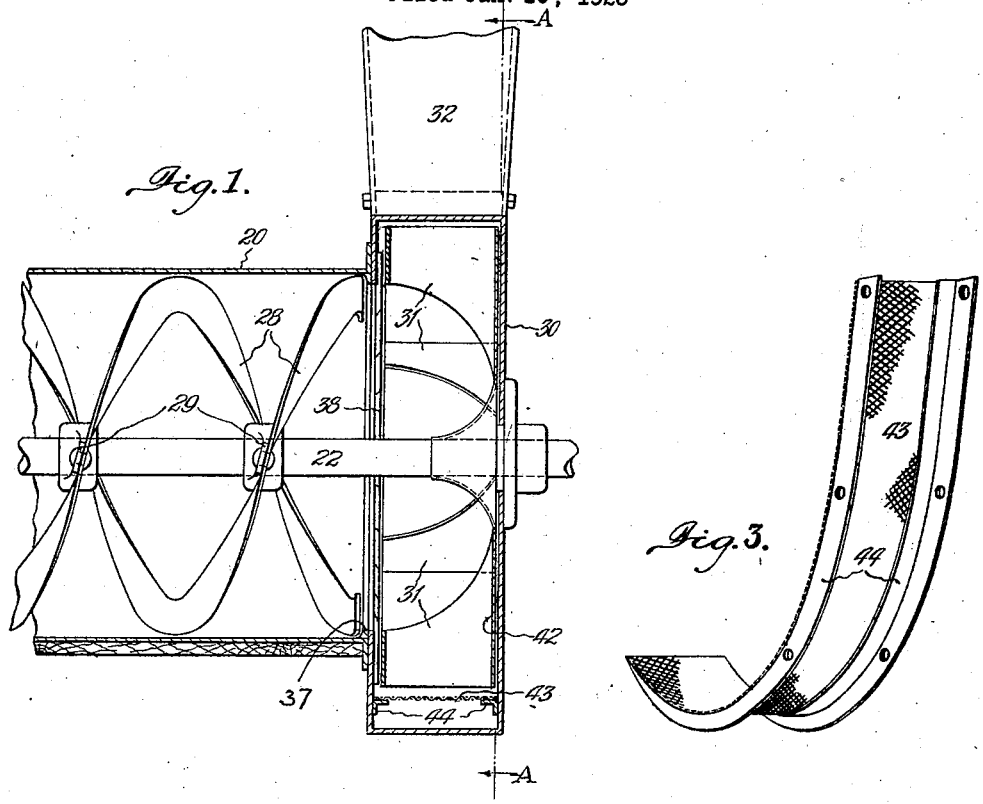
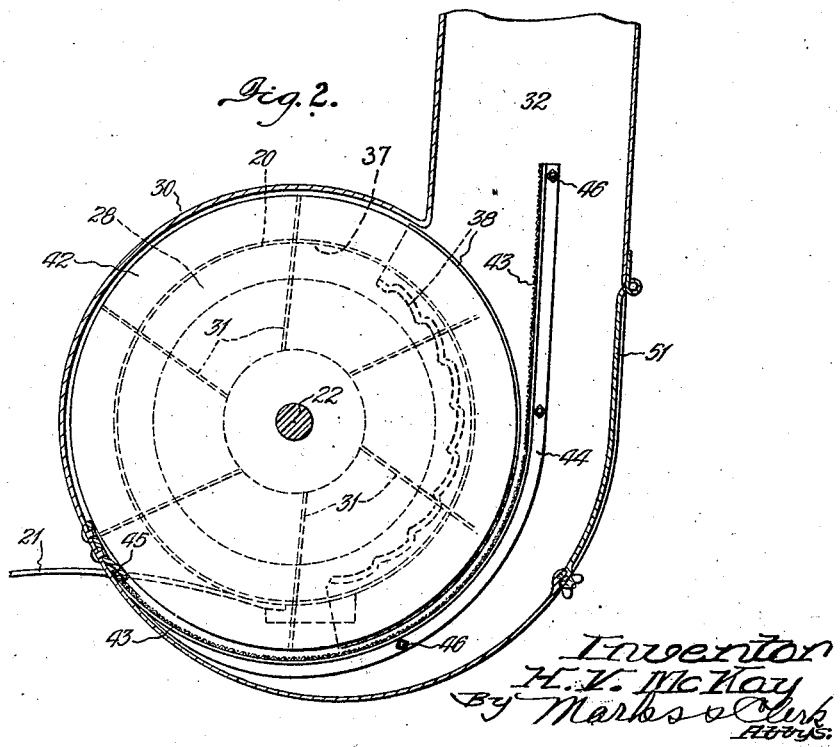
Inventor
H. V. McKay
By Marks & Clerk
Attys.

Patented Jan. 8, 1929.

1,697,925

UNITED STATES PATENT OFFICE.

HUGH VICTOR McKAY, OF SUNSHINE, AUSTRALIA, ASSIGNOR TO H. V. McKAY PROPRIETARY LIMITED, OF SUNSHINE, AUSTRALIA.

STRAW-CUTTING ATTACHMENT FOR HARVESTERS.

Application filed January 16, 1925, Serial No. 2,902, and in Australia April 24, 1924.

The invention has reference generally to improvements in harvesting machines and more particularly relates to a straw cutting attachment therefor.

Briefly the invention may be said to consist of combined feeding and conveying means for directing gathered grain and straw to a fan casing having blades rotatably mounted therein and adapted to create a blast to convey the grain and straw to the threshing mechanism, fixed cutting means being positioned at the intake opening of the fan casing and coacting with the conveying member and fan blades whereby the straw will be cut into short lengths and will not clog or interfere with the action of the fan.

The heads of the grain may be removed by a comb and beater arrangement; the means for conveying the heads transversely may comprise rotating helical heater blades operating within a drum and a draught produced by a fan which likewise is adapted to deliver the heads to a grain separating and cleaning apparatus.

The conveyance of the heads to the grain separating and cleaning apparatus by the draught of air created by the fan eliminates mechanical conveyors, and, for this purpose, the said fan is provided with a tangential throat leading to a chute (not shown) through which the threshed grain and chaff are directed to the cleaning mechanism. Another feature resides in means for enabling a portion of the same blast of air to be utilized in the cleaning of the threshed grain.

In the accompanying drawings, wherein similar reference characters designate corresponding parts throughout the several views:—

The invention consists essentially in the features of novelty in the construction, combination and arrangement of the several parts shown in the accompanying drawings and described in the specification but more particularly set out in the appended claiming clause.

Figure 1 is a view in sectional front elevation of a beater drum and fan,

Figure 2 is a view in sectional side elevation taken on the dotted line 2—2 of Fig. 1, and Figure 3 is a view in perspective of the details and construction of the same.

In these drawings the numeral 20 designates the beater drum which is mounted on the front of the machine (not shown) and at the rear of a comb 21 constructed and arranged in the ordinary way. A shaft 22 passes axially through the drum 20 and is rotated by suitable means (not shown). One or more helical combined beating and conveying blades 28 are supported on arms 29 fitted to the said shaft and when more than one blade is used they are interwoven with each other or arranged in the same manner as multiple threads on a screw.

The pitch of the combined beating and conveying blades 28 can be approximately equal to the diameter of the beater drum 20 or it may be slightly greater than the diameter of the said drum.

In Figures 1 and 2 of the drawings the beater shaft 22 is shown supporting two helical blades 28.

In the drawings the beater blades 28 are shown made of flat bars.

In machines having a narrow cut only one set of beaters may be employed and the blades are set to deliver the threshed and partially threshed material and straw to the intake opening of a fan casing 30 arranged concentrically at the inner end of the drum. The part of the beater shaft which passes through the fan casing 30 is fitted with fan blades 31 and the action of these fan blades is such that it facilitates the entrance of the material to the fan casing and projects it forcibly upward through a tangential throat 32 to a thresher or the like (not shown).

The intake opening 37 of the fan may be of the same diameter or approximately the same diameter as the beater drum 20.

In Figure 1 the beater blades 28 are shown terminating close to the eye of the fan and a curved cutting blade 38 is fitted to the inside of the fan casing at the back of the said eye. The curved cutting blade 38 is formed with a serrated cutting edge which is so disposed that any long straw entering the beater drum and passing to the eye of the fan will be cut into short lengths and thereby obviate the choking of the fan.

The ends of the beater blades 28 adjacent to the fan casing may be bent to lie in a plane passing transversely through the beater drum and as shown in Figure 1.

The back and lower part of the fan casing 30 is disposed at some distance from the periphery of the rotor 42 carrying the fan blades 31 and a screen 43 is secured within the casing so as to lie close to the rear and underside of the said rotor.

The screen 42 may consist of a piece of stout wire gauze supported on angle shaped side members 44 removably fitted within the fan casing.

When the screen is removably inserted in the casing of the fan the forward end thereof is passed beneath a tongue 45 on the bottom of the said casing and the angle shaped side members are removably secured to the fan casing by means of bolts 46 or the like.

When the screen is made of wire gauze or like material, the forcible projection of the material thereover has the effect of removing the grain from partially threshed heads and thereby assists in the action of threshing the same.

When the fan is in operation portion of the air blast will be passed through the perforations in the screen and be projected up behind the same to meet the material as it enters the thresher (not shown).

It will be obvious that in different types of machines the threshing and winnowing apparatus may vary considerably and that the air blast taken from the rear of the fan casing can be used in divers ways for assisting in the cleaning and separating of the grain.

The rear of the fan casing 30 may be provided with an opening having a suitable cover 51 whereby any material collecting between the screen 43 and the rear of the fan casing can be conveniently removed.

I claim:

In a machine of the character described, in combination, a casing having an intake opening, fan blades operating in the casing, means for conveying material to said intake opening, a curved serrated knife fixed adjacent to said intake opening and coacting with the conveying means and the fan blades whereby straw will be cut into short lengths, and a screen interposed between the fan blades and the casing, substantially as and for the purposes described.

HUGH VICTOR McKAY.